US010931970B2

(12) United States Patent
Jeon et al.

(10) Patent No.: US 10,931,970 B2
(45) Date of Patent: *Feb. 23, 2021

(54) METHOD AND APPARATUS FOR INTRA PREDICTION

(71) Applicant: RESEARCH & BUSINESS FOUNDATION SUNGKYUNKWAN UNIVERSITY, Suwon-si (KR)

(72) Inventors: Byeung Woo Jeon, Seongnam-si (KR); Ho Young Lee, Suwon-si (KR); Kwang Hyun Won, Bucheon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/531,470

(22) Filed: Aug. 5, 2019

(65) Prior Publication Data
US 2019/0356929 A1 Nov. 21, 2019

Related U.S. Application Data

(63) Continuation of application No. 16/004,592, filed on Jun. 11, 2018, now Pat. No. 10,375,414, which is a (Continued)

(30) Foreign Application Priority Data

Feb. 6, 2013 (KR) .......... 10-2013-0013547
Mar. 8, 2013 (KR) .......... 10-2013-0024988

(51) Int. Cl.
H04N 19/11 (2014.01)
H04N 19/15 (2014.01)
(Continued)

(52) U.S. Cl.
CPC ......... *H04N 19/593* (2014.11); *H04N 19/105* (2014.11); *H04N 19/117* (2014.11);
(Continued)

(58) Field of Classification Search
CPC ... H04N 19/593; H04N 19/117; H04N 19/182
(Continued)

(56) References Cited

U.S. PATENT DOCUMENTS 10,375,414 B2* 8/2019 Jeon ............... H04N 19/176
2009/0161992 A1 6/2009 Taguchi et al.
(Continued)

FOREIGN PATENT DOCUMENTS

WO WO 2011/145601 A1 11/2011

OTHER PUBLICATIONS

Korean Office Action dated Feb. 5, 2014 in counterpart Korean Application No. KR 10-2013-0024988 (4 pages in Korean).

*Primary Examiner* — Jeffery A Williams
(74) *Attorney, Agent, or Firm* — NSIP Law

(57) ABSTRACT

Disclosed herein are a method and apparatus for filtering a reference pixel. A method of smoothing a reference pixel may include determining whether or not to perform smoothing on a reference pixel based on the size of a transform block and information about an intra-prediction mode for the transform block and determining a smoothing method by comparing the size of the transform block with the size of a maximum transform block. Accordingly, image coding efficiency can be increased, and picture quality can be improved.

9 Claims, 7 Drawing Sheets

Related U.S. Application Data continuation of application No. 15/477,352, filed on Apr. 3, 2017, now Pat. No. 9,998,759, which is a continuation of application No. 14/173,992, filed on Feb. 6, 2014, now Pat. No. 9,615,086.

(51) Int. Cl.
*H04N 19/59* (2014.01)
*H04N 19/593* (2014.01)
*H04N 19/176* (2014.01)
*H04N 19/117* (2014.01)
*H04N 19/157* (2014.01)
*H04N 19/82* (2014.01)
*H04N 19/182* (2014.01)
*H04N 19/105* (2014.01)
*H04N 19/159* (2014.01)

(52) U.S. Cl.
CPC ......... *H04N 19/157* (2014.11); *H04N 19/159* (2014.11); *H04N 19/176* (2014.11); *H04N 19/182* (2014.11); *H04N 19/82* (2014.11)

(58) Field of Classification Search
USPC .................................................. 375/240.02
See application file for complete search history.

(56) References Cited

U.S. PATENT DOCUMENTS

| | | |
|---|---|---|
| 2012/0082224 A1 | 4/2012 | Van Der Auwera et al. |
| 2012/0320974 A1 | 12/2012 | Li et al. |
| 2013/0094572 A1 | 4/2013 | Van Der Auwera et al. |

* cited by examiner

FIG. 4

|     | X0 | X1 | X2 | X3 | X4 | X5 | X6 | X7 | X8 |
|-----|----|----|----|----|----|----|----|----|----|
| Y1  |    |    |    |    |    |    |    |    |    |
| Y2  |    |    |    |    |    |    |    |    |    |
| Y3  |    |    |    |    |    |    |    |    |    |
| Y4  |    |    |    |    |    |    |    |    |    |
| Y5  |    |    |    |    |    |    |    |    |    |
| Y6  |    |    |    |    |    |    |    |    |    |
| Y7  |    |    |    |    |    |    |    |    |    |
| Y8  |    |    |    |    |    |    |    |    |    |

|     | X0 | X1 | X2 | X3 | X4 | X5 | X6 | X7 | X8 |
|-----|----|----|----|----|----|----|----|----|----|
|     | 500| 510| 520| 530| 540| 550| 560| 570| 580|
| Y1  |    |    |    |    |    |    |    |    |    |
| Y2  |    |    |    |    |    |    |    |    |    |
| Y3  |    |    |    |    |    |    |    |    |    |
| Y4  |    |    |    |    |    |    |    |    |    |
| Y5  |    |    |    |    |    |    |    |    |    |
| Y6  |    |    |    |    |    |    |    |    |    |
| Y7  |    |    |    |    |    |    |    |    |    |
| Y8  |    |    |    |    |    |    |    |    |    |

US 10,931,970 B2

METHOD AND APPARATUS FOR INTRA PREDICTION

CROSS-REFERENCE TO RELATED APPLICATIONS

This application is a continuation of U.S. patent application Ser. No. 16/004,592, filed on Jun. 11, 2018, and issued as U.S. Pat. No. 10,375,414 on Aug. 6, 2019, which is a continuation of U.S. patent application Ser. No. 15/477,352 filed on Apr. 3, 2017 and issued as U.S. Pat. No. 9,988,759 on Jun. 12, 2018, which is a continuation of U.S. patent application Ser. No. 14/173,992 filed on Feb. 6, 2014 and issued as U.S. Pat. No. 9,615,086 on Apr. 4, 2017, which claims the benefit under 35 USC 119(a) of Korean Patent Application No. 10-2013-0024988 filed on Mar. 8, 2013 and Korean Patent Application No. 10-2013-0013547 filed on Feb. 6, 2013, the entire disclosures of which are incorporated herein by reference for all purposes.

BACKGROUND OF THE INVENTION

Field of the Invention

The present invention relates to an image encoding/decoding method and apparatus and, more particularly, to an intra-prediction method.

Discussion of the Related Art

Recently, a demand for images having high resolution and high quality, such as High Definition (HD) images and Ultra High Definition (UHD) images, is increasing in various application fields. As image data becomes high resolution and high quality, the amount of data is relatively more increased than existing image data. If image data is transmitted using an existing wired/wireless broadband line or stored using an existing storage medium, transmission costs and storage costs are increased. In order to solve the problems occurring due to the high resolution and high quality of image data, high-efficiency image compression techniques can be used.

The image compression techniques may include various techniques, such as an inter-prediction technique for predicting a pixel value included in a current picture in pictures anterior or posterior to the current picture, an intra-prediction technique for predicting a pixel value included in a current picture using information about pixels within the current picture, and an entropy coding technique for assigning a short symbol to a value having a high frequency of appearance and a long symbol to a value having a low frequency of appearance. Image data can be effectively compressed, transmitted, or stored using such image compression techniques.

SUMMARY OF THE INVENTION

An object of the present invention is to provide an intra-prediction method.

Another object of the present invention is to provide an apparatus for performing an intra-prediction method.

In accordance with an aspect of the present invention, an intra-prediction method may include determining whether or not to perform smoothing on a reference pixel based on the size of a transform block and information about an intra-prediction mode for the transform block and determining a smoothing method by comparing the size of the transform block with the size of a maximum transform block. The determining of whether or not to perform smoothing on the reference pixel based on the size of the transform block and the information about the intra-prediction mode for the transform block may include determining whether or not the size of the transform block is 8×8 and the intra-prediction mode for the transform block is one of a No. 2 intra-prediction mode, a No. 18 intra-prediction mode, a No. 34 intra-prediction mode, and a planar mode, determining whether or not the size of the transform block is 16×16 and the intra-prediction mode for the transform block is one of a No. 2 intra-prediction mode to a No. 8 intra-prediction mode, a No. 1 intra-prediction mode to a No. 24 intra-prediction mode, a No. 28 intra-prediction mode to a No. 34 intra-prediction mode, and a planar mode, and determining whether or not the size of the transform block is 32×32 and the intra-prediction mode for the transform block is one of a No. 2 intra-prediction mode to a No. 34 intra-prediction mode and a planar mode other than a No. 10 intra-prediction mode and a No. 26 intra-prediction mode. The determining of the smoothing method by comparing the size of the transform block with the size of the maximum transform block may include determining a bi-linear smoothing filter to be the smoothing filter if, as a result of the comparison, the size of the transform block is identical with the size of the maximum transform block and determining a smoothing filter having filtering coefficients of [1,2,1] to be the smoothing filter if, as a result of the comparison, the size of the transform block is not identical with the size of the maximum transform block. The intra-prediction method may further include decoding flag information, wherein the flag information may be information for determining whether or not to perform smoothing on the reference pixel by determining whether or not to perform smoothing on the reference pixel based on the size of the transform block and the information about the intra-prediction mode for the transform block and determining the smoothing method by comparing the size of the transform block with the size of the maximum transform block. The intra-prediction method may further include determining an intra-prediction method for a specific intra-prediction mode by comparing the size of the transform block with the size of the maximum transform block.

In accordance with another aspect of the present invention, an image decoder may include an intra-prediction unit, wherein the intra-prediction unit may determine whether or not to perform smoothing on a reference pixel based on the size of a transform block and information about an intra-prediction mode for the transform block and determine a smoothing method by comparing the size of the transform block with the size of a maximum transform block. The intra-prediction unit may be configured to determine whether or not the size of the transform block is 8×8 and the intra-prediction mode for the transform block is one of a No. 2 intra-prediction mode, a No. 18 intra-prediction mode, a No. 34 intra-prediction mode, and a planar mode, determine whether or not the size of the transform block is 16×16 and the intra-prediction mode for the transform block is one of a No. 2 intra-prediction mode to a No. 8 intra-prediction mode, a No. 12 intra-prediction mode to a No. 24 intra-prediction mode, a No. 28 intra-prediction mode to a No. 34 intra-prediction mode, and a planar mode, and determine whether or not the size of the transform block is 32×32 and the intra-prediction mode for the transform block is one of a No. 2 intra-prediction mode to a No. 34 intra-prediction mode and a planar mode other than a No. 10 intra-prediction mode and a No. 26 intra-prediction mode. The intra-prediction unit may be configured to determine a bi-linear smoothing filter to be the smoothing filter if, as a result of the comparison, the size of the transform block is identical with the size of the maximum transform block and determine a smoothing filter having filtering coefficients of [1,2,1] to be the smoothing filter if, as a result of the comparison, the size of the transform block is not identical with the size of the maximum transform block. The image decoder may further include an entropy decoding unit. The entropy decoding unit may be configured to decode flag information, and the flag information may be information for determining whether or not to perform smoothing on the reference pixel by determining whether or not to perform smoothing on the reference pixel based on the size of the transform block and the information about the intra-prediction mode for the transform block and determining the smoothing method by comparing the size of the transform block with the size of the maximum transform block. The intra-prediction unit may be configured to determine an intra-prediction method for a specific intra-prediction mode by comparing the size of the transform block with the size of the maximum transform block.

Image coding efficiency can be increased and picture quality can be improved.

BRIEF DESCRIPTION OF THE DRAWINGS

FIG. 4 is a conceptual diagram showing a reference pixel smoothing method using a smoothing filter in accordance with an embodiment of the present invention;

FIG. 5 is a conceptual diagram showing a reference pixel smoothing method using a smoothing filter in accordance with an embodiment of the present;

DETAILED DESCRIPTION OF THE EMBODIMENTS

Elements described in the embodiments and drawings of the present invention have been disclosed as independent elements in order to indicate different and characteristic functions of an image coder. It does not necessarily mean that each of the elements is formed of a piece of separated hardware or a piece of software. That is, the elements are arranged and included, for convenience of description, and at least two of the elements may be combined to form one element or one element may be divided into a plurality of elements that perform functions. An embodiment in which some elements are integrated or embodiments in which some elements are separated are also included in the scope of the present invention unless they depart from the essence of the present invention.

Furthermore, some elements disclosed in the present invention are not essential elements for performing essential functions, but may be optional elements for improving only performance. The present invention may be implemented using only elements essential for implementing the essence of the present invention other than elements used to improve only performance, and a structure including only essential elements other than optional elements used to improve only performance is also included in the scope of the present invention.

Figure 1:
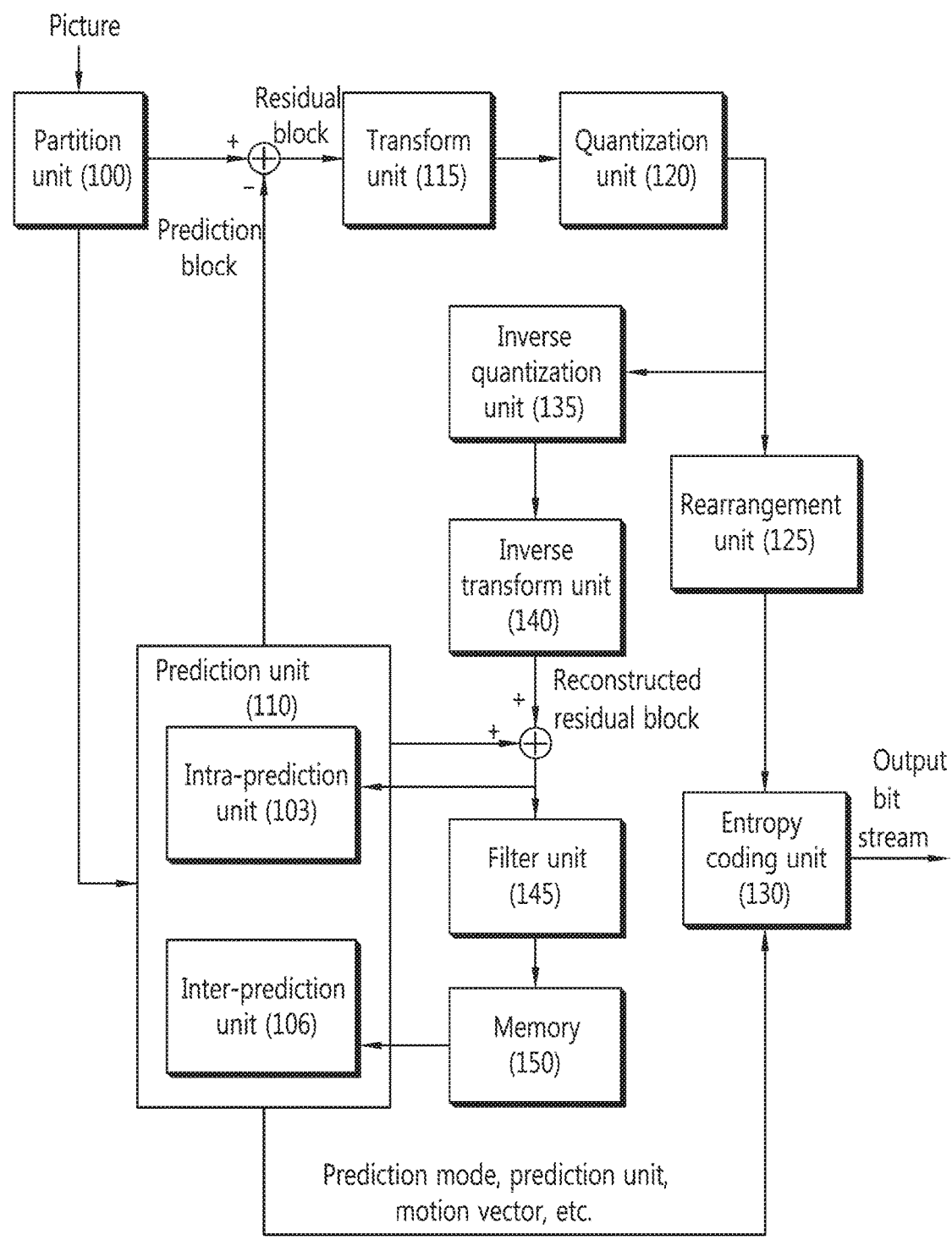
FIG. 1 is a conceptual diagram showing a coder in accordance with an embodiment of the present invention.

FIG. 1 is a conceptual diagram showing a coder in accordance with an embodiment of the present invention.

Referring to FIG. 1, the coder may include a partition unit 100, a prediction unit 110, an intra-prediction unit 103, an inter-prediction unit 106, a transform unit 115, a quantization unit 120, a rearrangement unit 125, an entropy coding unit 130, an inverse quantization unit 135, an inverse transform unit 140, a filter unit 145, and memory 150.

The coder may be implemented according to an image coding method described below in connection with an embodiment of the present invention, but an operation in some elements may not be performed in order to reduce the complexity of a coder or for fast real-time coding. For example, when the prediction unit performs intra-prediction, a method of using a limited number of intra-prediction modes and selecting one of the intra-prediction modes as the final intra-prediction mode, instead of a method of using all intra-prediction mode methods and selecting an optimum intra-coding method from all the intra-prediction mode methods, may be used in order to perform coding in real time. For another example, when performing intra-prediction or inter-prediction, a form of a prediction block used may be limitedly used.

The unit of a block processed by the coder may be a coding unit on which coding is performed, a prediction unit on which prediction is performed, or a transform unit on which transform is performed. The coding unit may also be represented as a term 'Cu', the prediction unit may also be represented as a term 'PU', and the transform unit may also be represented as a term 'TU'. Alternatively, the coding unit may also be represented as a term 'coding block', the prediction unit may also be represented as a term 'prediction block', and the transform unit may also be represented as a term 'transform block'.

The partition unit 100 can partition one picture into combinations of a plurality of coding blocks, prediction blocks, and transform blocks, select a combination of one coding block, prediction block, and transform block as a specific criterion (e.g., a cost function), and partition a picture using the selected combination. For example, in order to partition a coding block in a picture, a recurrence tree structure, such as a quad tree structure, may be used. Hereinafter, in an embodiment of the present invention, a coding block may mean a block to be decoded as well as a block to be coded.

A prediction block may become a unit on which intra-prediction or inter-prediction is performed. A block on which intra-prediction is performed may have a square form, such as 2N×2N or N×N, or a rectangle form using Short Distance Intra-Prediction (SDIP). A block on which inter-prediction is performed may have a square form, such as 2N×2N or N×N, or may include a prediction block partition method using Asymmetric Motion Partitioning (AMP), that is, 2N×N, N×2N, or an asymmetrical form in which a prediction block having a square form is bisected in the same form. A transform method performed by the transform unit 115 may be different depending on the type of prediction block.

The prediction unit 110 may include the intra-prediction unit 103 for performing intra-prediction and the inter-prediction unit 106 for performing inter-prediction. The prediction unit 110 can determine whether or not to use inter-prediction for a prediction block or whether or not to perform intra-prediction on a prediction block. A processing unit on which prediction is performed may be different from a unit of a processing block in which a prediction method is determined. For example, in performing intra-prediction, a prediction mode may be determined based on a prediction block, and a process of performing prediction may be performed based on a transform block. A residual value (or a residual block) between a generated prediction block and the original block can be inputted to the transform unit 115. Furthermore, information about a prediction mode and information about a motion vector that are used for prediction, together with the residual value, can be coded by the entropy coding unit 130 and transferred to a decoder.

If a Pulse Coded Modulation (PCM) coding mode is used, prediction may not be performed through the prediction unit 110, but the original block may be coded without change and transmitted to the decoder.

The intra-prediction unit 103 can generate an intra-predicted block based on reference pixels that are present in the periphery of a current block (i.e., a block to be predicted). In order to estimate an optimum intra-prediction mode for the current block, an intra-predicted block for the current block can be generated using a plurality of intra-prediction modes. The intra-prediction unit 103 can select a predicted block using one intra-prediction mode and uses the selected predicted block as a predicted block for the current block. In an intra-prediction method, an intra-prediction mode may include a directional prediction mode in which information about reference pixels is used depending on a prediction direction and a non-directional mode (or a DC mode or planar mode) in which directional information is not used when performing prediction. The type of mode for predicting luma information may be different from the type of mode for predicting chroma information. In order to predict chroma information, information about an intra-prediction mode predicted from luma information or information about a predicted luma signal may be used.

Regarding a current block on which intra-prediction has been determined to be performed using one intra-prediction mode, an intra-prediction mode for the current block can be predicted from information about an intra-prediction mode that has been used by the neighboring blocks of the current block when performing intra-prediction, and the information about the intra-prediction mode of the current block can be coded. That is, the intra-prediction mode for the current block can be predicted from intra-prediction modes for prediction blocks that are present in the periphery of the current block. The following methods may be used as a method of predicting an intra-prediction mode for a current block using information about modes that have been predicted from neighboring blocks.

1) If an intra-prediction mode for a current block is the same as an intra-prediction mode for neighboring blocks, specific flag information may be coded, and information indicating that the intra-prediction mode for the current block is the same as the intra-prediction mode for the neighboring blocks may be transmitted.

2) If an intra-prediction mode for a current block is different from an intra-prediction mode for neighboring blocks, information about the intra-prediction mode for the current block may be subject to entropy coding, and information about a prediction mode for the current block may be coded.

An intra-prediction mode for neighboring blocks used to code an intra-prediction mode for a current block in the methods 1) and 2) may be defined as a candidate intra-prediction mode and used.

If an intra-prediction mode for neighboring blocks is not available in performing the methods 1) and 2) (e.g., the neighboring blocks are not present or inter-prediction has been performed on the neighboring blocks), a predetermined and specific intra-prediction mode value may be set as a candidate intra-prediction mode value, and an intra-prediction mode for a current block may be predicted.

The intra-prediction unit 103 can generate an intra-predicted block based on information about reference pixels in the periphery of a current block, that is, information about pixels within the current picture. If a block neighboring a current block is a block on which inter-prediction has been performed, a reference pixel may be a pixel reconstructed from a pixel that has been predicted by performing inter-prediction. In such a case, the current block may be subject to intra-prediction using the pixels of the neighboring block on which intra-prediction has been performed as reference pixels without using the reconstructed pixel. That is, if a reference pixel is not available, the unavailable reference pixel may be replaced with another pixel.

A prediction block may include a plurality of transform blocks. If the size of a prediction block is the same as the size of a transform block when performing intra-prediction, intra-prediction is performed on the prediction block based on a pixel present on the left of the prediction block, a pixel present at the left top of the prediction block, and a pixel present at the top. If the size of a prediction block is different from the size of a transform block and the prediction block includes a plurality of transform blocks when performing intra-prediction, however, intra-prediction may be performed using reference pixels determined based on the transform blocks.

Furthermore, one coding block may be partitioned into a plurality of prediction blocks. If the size of a coding block is a minimum, intra-prediction may be performed using an N×N partition in which one coding block is partitioned into four prediction blocks having a square form in relation to only the minimum coding block.

The inter-prediction unit 106 can perform prediction with reference to information about a block that is included in at least one picture that belong pictures anterior or posterior to a current picture. The inter-prediction unit 106 may include a reference picture interpolation unit, a motion prediction unit, and a motion compensation unit.

The reference picture interpolation unit can receive information about a reference picture from the memory 150 and generate information about pixels of an integer pixel or less in the reference picture. In the case of a luma pixel, a DOT-based 8-tap interpolation filter using different filter coefficients may be used in order to generate information about pixels of an integer pixel or less in a ¼ pixel unit. In the case of a chroma signal, a DOT-based 4-tap interpolation filter using different filter coefficients may be used in order to generate information about pixels of an integer pixel or less in a ⅛ pixel unit.

The inter-prediction unit 106 can perform motion prediction based on a reference picture that has been interpolated by the reference picture interpolation unit. Various methods, such as a Full search-based Block Matching Algorithm (FBMA), Three Step Search (TSS), and a New Three-Step search algorithm (NTS), may be used as a method for calculating a motion vector. The motion vector may have an integer or a motion vector value of a ½ or ¼ pixel unit based on an interpolated pixel. The inter-prediction unit 106 can perform prediction on a current block using one of multiple inter-prediction methods. Various methods, such as a skip method, a merge method, and an Advanced Motion Vector Prediction (AMVP) method, may be used as the inter-prediction methods.

A residual block including information about a residual value, that is, a difference between a predicted block (i.e., an intra-predicted block or an inter-predicted block) generated from the prediction unit 110 and the original block of the predicted block, can be generated.

The residual block can be inputted to the transform unit 115. The transform unit 115 can transform the residual block, including information about a residual value between the original block and a predicted block, using a transform method, such as Discrete Cosine Transform (DCT) or Discrete Sine Transform (DST). Whether DCT or DST will be applied in order to transform the residual block may be determined based on information about an intra-prediction mode for a prediction block used to generate the residual block and information about the size of the prediction block. That is, the transform unit 115 may use a different transform method depending on the size of a prediction block and a prediction method.

The quantization unit 120 can quantize values that have been transformed into a frequency domain by the transform unit 115. A quantization coefficient may vary depending on a block or the importance of an image. A value calculated by the quantization unit 120 can be provided to the inverse quantization unit 135 and the rearrangement unit 125.

The rearrangement unit 125 can perform the rearrangement of coefficient values on the quantized residual value. The rearrangement unit 125 can change coefficients of a two-dimensional block form into a one-dimensional vector form through a coefficient scanning method. For example, the rearrangement unit 125 can change coefficients of a two-dimensional block form into a one-dimensional vector form by performing scanning from a DC coefficient to coefficients of a high frequency domain using an up-right diagonal scan method. A vertical scan method of scanning coefficients of a two-dimensional block form in a column direction or a horizontal scan method of performing scanning coefficients of a two-dimensional block form in a row direction not the up-right diagonal scan method may be used depending on the size of a transform block and an intra-prediction mode. That is, which one of the up-right diagonal scan method, the vertical scan method, and the horizontal scan method will be used may be determined depending on the size of a transform block and an intra-prediction mode.

The entropy coding unit 130 can perform entropy coding based on values calculated by the rearrangement unit 125. The entropy coding may be performed using at least one of various coding methods, such as exponential Golomb, Context-Adaptive Variable Length Coding (CAVLC), and Context-Adaptive Binary Arithmetic Coding (CABAC).

The entropy coding unit 130 can receive various pieces of information, such as information about a residual coefficient of a coding block, information about a block type, information about a prediction mode, information about a partition unit, information about a prediction block, information about a motion vector, information about a reference frame, and block interpolation, and filtering information, from the rearrangement unit 125 and the prediction unit 110 and perform entropy coding according to a specific coding method using the various pieces of information. Furthermore, the entropy coding unit 130 can perform entropy coding on a residual coefficient of a coding block received from the rearrangement unit 125.

The inverse quantization unit 135 and the inverse transform unit 140 perform inverse quantization on values quantized by the quantization unit 120 and inverse transform on values transformed by the transform unit 115, respectively. The residual values generated from the inverse quantization unit 135 and the inverse transform unit 140 can be combined with a prediction block predicted through the motion estimation unit, the motion compensation unit and the intra-prediction unit included in the prediction unit 110, thereby being capable of generating a reconstructed block.

The filter unit 145 may include at least one of a deblocking filter, an offset correction unit, and an Adaptive Loop Filter (ALF).

The deblocking filter removes block distortion, generated due to the boundary between blocks, from a reconstructed picture. In order to determine whether or not to perform deblocking, whether or not to apply the deblocking filter to a current block may be determined based on pixels included in some columns or rows of the current block. If the deblocking filter is applied to the current block, a strong filter or a weak filter may be applied depending on the strength of necessary deblocking filtering. Furthermore, in applying the deblocking filter, horizontal filtering and vertical filtering may be performed in parallel when performing the vertical filtering and the horizontal filtering.

The offset correction unit can correct an image on which deblocking has been performed in a pixel unit using a difference between the image and the original image as an offset. In order to perform offset correction on a specific picture, a method of dividing pixels included in an image into a specific number of regions, determining a region on which the offset will be performed, and applying the offset to the determined region, or a method of applying an offset by taking information about the edge of each pixel into consideration may be used.

The Adaptive Loop Filter (ALF) can perform filtering based on a value, that is, a result of a comparison between a filtered and reconstructed image and the original image. Pixels included in an image may be divided into one or more groups, one filter to be applied to each group may be determined, and different filtering may be performed on each group. Information regarding whether the ALF will be applied or not may be transmitted as a luma signal for each coding block, and the size and coefficients of an ALF to be applied may be different depending on each block. The ALF may have various forms, and the number of coefficients included in an ALF may be different. Filtering-related information (e.g., information about filter coefficients, ALF on/off information, and information about a filter form) about the ALF may be included in a parameter set in a bit stream form and transmitted.

The memory 150 can store a reconstructed block or picture obtained by the filter unit 145, and the stored reconstructed block or picture can be provided to the prediction unit 110 when performing inter-prediction.

Figure 2:
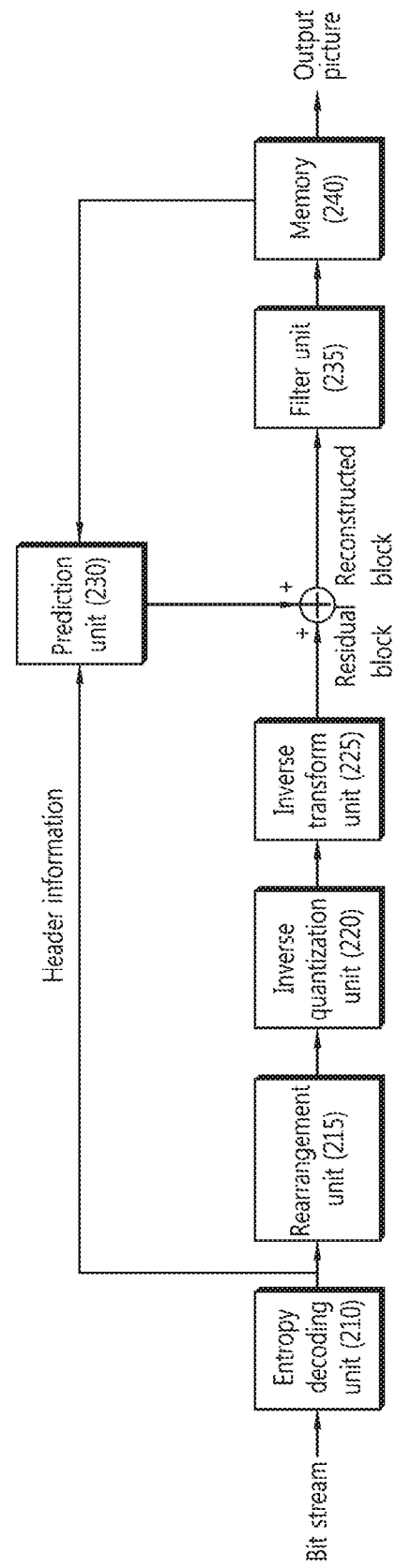
FIG. 2 is a block diagram of a decoder in accordance with an embodiment of the present invention.

FIG. 2 is a block diagram of a decoder in accordance with an embodiment of the present invention.

Referring to FIG. 2, the decoder may include an entropy decoding unit 210, a rearrangement unit 215, an inverse quantization unit 220, an inverse transform unit 225, a prediction unit 230, a filter unit 235, and memory 240.

When a bit stream is received from the coder, the input bit stream can be decoded in a procedure opposite the procedure of the coder.

The entropy decoding unit 210 can perform entropy decoding in a procedure opposite a procedure performed by the entropy coding unit of the coder. Information for generating a prediction block, of pieces of information decoded by the entropy decoding unit 210, is provided to the prediction unit 230. Residual values, that is, the results of the entropy decoding performed by the entropy decoding unit 210, can be inputted to the rearrangement unit 215.

The entropy decoding unit 210 can decode information related to intra-prediction and inter-prediction performed by the coder.

The rearrangement unit 215 can perform rearrangement on the bit stream on which entropy decoding has been performed by the entropy decoding unit 210 according to a method rearranged by the coder. The rearrangement unit 215 can rearrange coefficients represented in a one-dimensional vector form by reconstructing the coefficients into coefficients of a two-dimensional block form. The rearrangement unit 215 can receive information related to the scanning of coefficients performed by the coder and perform rearrangement on the information according to an inverse scanning method based on scanning sequence performed by the coder.

The inverse quantization unit 220 can perform inverse quantization based on a quantization parameter provided by the coder and the coefficient values of a rearranged block.

The inverse transform unit 225 can perform inverse DCT and inverse DST on the results of quantization performed by the coder in relation to DCT and DST performed by the transform unit of the coder. The inverse DCT and inverse DST may be performed based on a transform block determined by the coder. The transform unit of the coder may selectively perform DCT and DST depending on a plurality of pieces of information, such as a prediction method, the size of a current block, and a prediction direction. Like in the coder, the inverse transform unit 225 of the decoder can perform inverse DCT and inverse DST based on transform information on which the transform unit has performed DCT and DST. When performing inverse DCT and inverse DST, the inverse transform unit 225 of the decoder may perform inverse DCT and inverse DST based on a coding block not based on a transform block.

The prediction unit 230 can generate a prediction block based on information related to the generation of a prediction block that has been provided by the entropy decoding unit 210 and a previously decided block provided by the memory 240 or picture information.

Like in an operation performed by the coder as described above, if the size of a prediction block is the same as the size of a transform block when performing intra-prediction, intra-prediction is performed on a prediction block based on a pixel on the left of the prediction block, a pixel at the left top of the prediction block, and a pixel at the top of the prediction block. If a transform block is included in a prediction block when performing intra-prediction, however, intra-prediction may be performed using a reference pixel based on the transform block. Furthermore, intra-prediction using an N×N partition may be used for only a coding block having a minimum size as described above.

The prediction unit 230 may include a prediction block determination unit, an inter-prediction unit, and an intra-prediction unit. The prediction block determination unit can receive various pieces of information, such as information about the prediction block, information about a prediction mode for an intra-prediction method, and information related to the motion prediction of an inter-prediction method, from the entropy decoding unit 210, detect the prediction block in a coding block, and determine whether inter-prediction or intra-prediction is performed on the prediction block. The inter-prediction unit can perform inter-prediction on a current prediction block based on information included in at least one of pictures anterior or posterior to a current picture that includes the current prediction block using information necessary to perform the inter-prediction on the current prediction block which has been provided by the coder.

The inter-prediction unit can determine that a motion prediction method for a prediction block included in a corresponding coding block is any one of a skip mode, a merge mode, and an AMVP mode based on a coding block in order to perform inter-prediction.

The intra-prediction unit can generate a prediction block based on information about pixels within a current picture. If the prediction block is a prediction block on which intra-prediction has been performed, the intra-prediction unit can perform intra-prediction based on information about an intra-prediction mode for a prediction block that has been provided by the coder.

A block predicted by the prediction unit 230 can be merged with information about a decoded residual block, thereby being capable of generating a reconstructed block.

The reconstructed block or picture can be provided to the filter unit 235. The filter unit 235 may include a deblocking filter, an offset correction unit, and an ALF.

Information regarding whether or not the deblocking filter has been applied to a corresponding block or picture and information on which whether a strong filter or a weak filter has been applied can be determined if the deblocking filter has been applied can be received from the coder. The deblocking filter of the decoder can receive information related to the deblocking filter from the coder, and the decoder can perform deblocking filtering on a corresponding block. Like in the coder, first, the decoder performs vertical deblocking filtering and horizontal deblocking filtering, but may perform at least one of vertical deblocking and horizontal deblocking in an overlapping portion. Vertical deblocking filtering or horizontal deblocking filtering that has not been previously performed may be performed in the vertical deblocking filtering and the horizontal deblocking filtering. Such a deblocking filtering process enables the parallel processing of deblocking filtering.

The offset correction unit can perform offset correction on a reconstructed image based on the type of offset correction that has been applied to an image when performing coding and information about an offset value.

The ALF can perform filtering based on a value, that is, a result of a comparison between the reconstructed image and the original image, after performing filtering. The ALF can be applied to a coding block based on information regarding whether or not the ALF has been applied that has been provided by the coder and information about ALF coefficients. Such ALF information may be included in a specific parameter set and provided.

The memory 240 can store the reconstructed picture or block so that the reconstructed picture or block can be used as a reference picture or a reference block and provide the reconstructed picture to an output unit.

As described above, although a coding unit is also called a coding block in embodiments of the present invention, for convenience of description, the coding block may be a block that means a unit on which decoding as well as coding is performed. Hereinafter, reference pixel filtering methods in accordance with embodiments of the present invention described with reference to FIGS. 3 to 7 may be implemented according to the functions of the unit described with reference to FIGS. 1 and 2, and the coder and the decoder are included in the scope of the present invention.

A transform block used in the following embodiments of the present invention may be one block unit of the present invention. That is, a transform block used in the following embodiments of the present invention may be interpreted as the meaning of a block, and such an embodiment is also included in the scope of the present invention.

A reference pixel smoothing method in accordance with an embodiment of the present invention relates to a method of performing smoothing on a reference pixel by adaptively selecting a smoothing method based on information about an intra-prediction mode, the size of a current block (or transform block), and information about the size of a predetermined maximum transform block in performing smoothing on a reference pixel used to perform intra-prediction.

Subjective picture quality can be improved by adaptively selecting a smoothing method based on information about an intra-prediction mode, the size of a current block (or transform block), and information about the size of a predetermined maximum transform block in performing smoothing on a reference pixel used to perform intra-prediction and performing smoothing on a reference pixel using the selected smoothing method. Furthermore, a function capable of adaptively selecting a smoothing method based on the size of a maximum transform block and the size of a transform block can be implemented in an on/off form. If the function capable of adaptively selecting a smoothing method based on the size of a maximum transform block and the size of a transform block is not used, the coder may not determine the size of a maximum transform block by taking the smoothing of a reference pixel into consideration when determining the size of the maximum transform block.

Furthermore, a function of adaptively selecting a smoothing method based on information about an intra-prediction mode, the size of a current block (or transform block), and information about the size of a predetermined maximum transform block when performing smoothing on a reference pixel can be implemented in an on/off form. Accordingly, the complexity of the coder and the decoder can be reduced, and coding and decoding speed can be increased.

Figure 3:
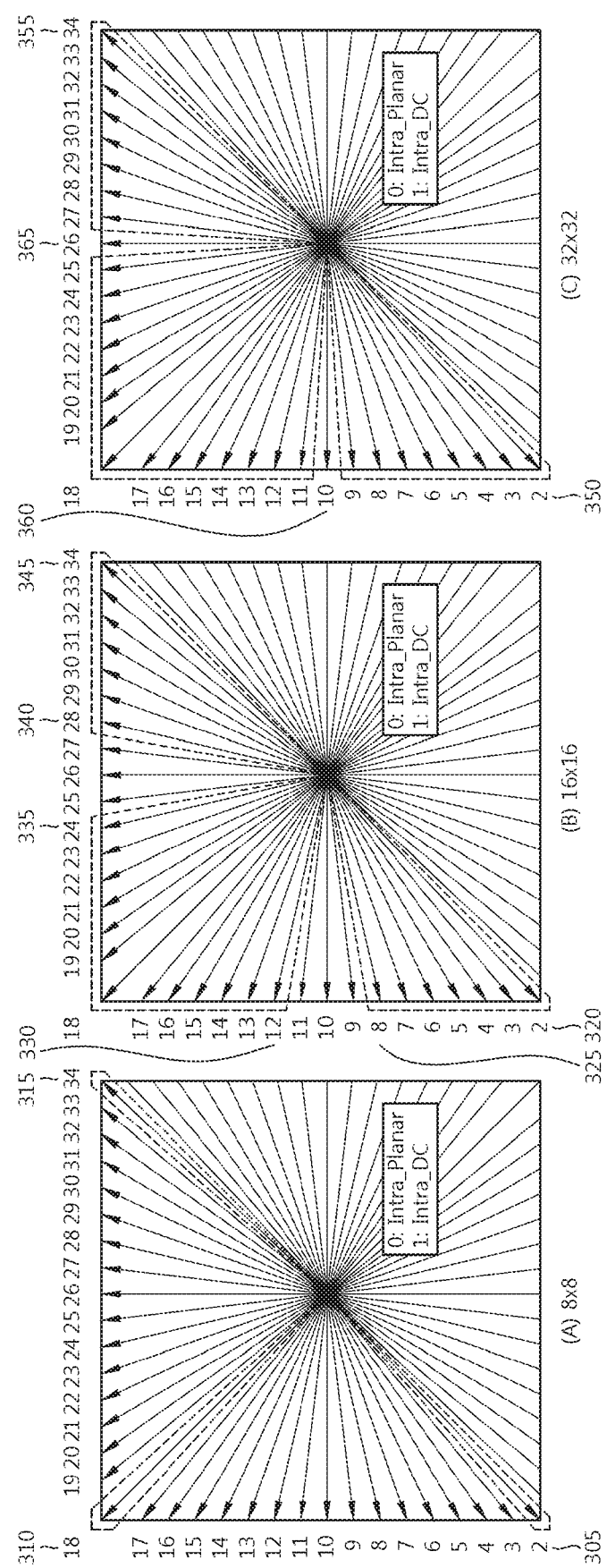
FIG. 3 is a conceptual diagram showing a smoothing filter application method for a reference pixel in accordance with an embodiment of the present invention.

FIG. 3 is a conceptual diagram showing a smoothing filter method applied to a reference pixel in accordance with an embodiment of the present invention.

FIG. 3 shows an intra-prediction mode in which smoothing is applied to a reference pixel according to the size of a transform block.

FIG. 3(A) shows a case where the size of a transform block is 8×8. If the size of a transform block is 8×8, smoothing can be performed on a reference pixel only when the transform block is a specific intra-prediction mode. An intra-prediction mode in which smoothing is performed on a reference pixel may include a No. 2 intra-prediction mode 305, a No. 18 intra-prediction mode 310, and a No. 34 intra-prediction mode 315 that belong to a directional intra-prediction mode and a planar mode that belongs to a non-directional prediction mode.

FIG. 3(B) shows a case where the size of a transform block is 16×16. If the size of a transform block is 16×16, smoothing can be performed on a reference pixel only when the transform block is a specific intra-prediction mode. An intra-prediction mode in which smoothing is performed on a reference pixel may include a No. 2 intra-prediction mode 320 to a No. 8 intra-prediction mode 325, a No. 12 intra-prediction mode 330 to a No. 24 intra-prediction mode 335, and a No. 28 intra-prediction mode 340 to a No. 34 intra-prediction mode 345 that belong to a directional intra-prediction mode and a planar mode that belongs to a non-directional prediction mode.

FIG. 3(C) shows a case where the size of a transform block is 32×32. If the size of a transform block is 32×32, smoothing can be performed on a reference pixel only when the transform block is a specific intra-prediction mode. An intra-prediction mode in which smoothing is performed on a reference pixel may include a No. 2 intra-prediction mode 350 to the No. 34 intra-prediction mode 355 other than a No. 10 intra-prediction mode 360 and a No. 26 intra-prediction mode 365, which belong to a directional intra-prediction mode, and a planar mode that belongs to a non-directional prediction mode. Referring to FIGS. 3(A) to 3(C), the number of intra-prediction modes in which smoothing is performed on a reference pixel can be increased as the size of a transform block is increased. If such a method is used, a phenomenon in which picture quality is deteriorated due to contouring artifacts that may occur in a large block relatively more can be prevented.

If the size of a transform block is 4×4, smoothing may not be performed on a reference pixel when performing intra-prediction on the 4×4 transform block because whether or not picture quality is deteriorated does not greatly depend on whether or not smoothing is performed on a reference pixel.

In accordance with an embodiment of the present invention, whether the size of a transform block is the same as the size of a maximum transform block or not may be previously determined, and smoothing may be then performed on a reference pixel using a different smoothing filter.

For example, the size of a transform block is the same as the size of a maximum transform block, a bi-linear filter may be used as a smoothing filter. If the size of a transform block is not the same as the size of a maximum transform block, that is, if the size of a transform block is smaller than the size of a maximum transform block, a smoothing filter having filtering coefficients of [1, 2, 1] may be used as a smoothing filter.

Information about the size of a maximum transform block can be transmitted to the decoder through a higher layer syntax (e.g., a Sequence Parameter Set (SPS) or a Picture Parameter Set (PPS)). The prediction unit of the decoder can determine the type of smoothing filter to be applied to a current transform block by comparing information about the size of a maximum transform block that is indicated by the coder with the size of a transform block on which intra-prediction is currently performed.

FIG. 4 is a conceptual diagram showing a reference pixel smoothing method using a smoothing filter in accordance with an embodiment of the present invention.

FIG. 4 shows a smoothing filter that is used when the size of a transform block is not the same as the size of a maximum transform block.

A filter having filtering coefficients of [1, 2, 1] can be used as the smoothing filter that is used when the size of a transform block is not the same as the size of a maximum transform block. The filtering coefficients are illustrative, and another weight may be used as the filtering coefficients. Furthermore, the filter having the aforementioned filtering coefficients is a filter into which only information about only three pixels of a pixel to be filtered and pixels neighboring the pixel to be filtered has been incorporated. If more neighboring pixels are used, the number of filter coefficients can be increased.

If the size of a transform block is nT, a reference pixel may be p[x][y](x=−1, y−1 . . . nT*2−1, x=−1 . . . nT*2−1, y=−1). If a smoothing filter having coefficients of [1, 2, 1]

is used, a filtered reference pixel p[x][y](x=−1, y=−1 ... nT*2−1, x=−1 ... nT*2−1, y=−1) can be calculated as in Equation 1 below.

$$pF[-1][nT*2-1]=p[-1][nT*2-1]$$

$$pF[nT*2-1][-1]=p[nT*2-1][-1]$$

$$pF[-1][y]=(p[-1][y+1]+2*p[-1][y]+p[-1][y-1]+2)>>2 \text{ for } y=nT*2-2 \ldots 0$$

$$pF[-1][-1]=(p[-1][0]+2*p[-1][-1]+p[0][-1]+2)>>2$$

$$pF[x][-1]=(p[x-1][-1]+2*p[x][-1]+p[x+1][-1]+2)>>2 \text{ for } x=0 \ldots nT*2-2 \quad (1)$$

Referring to Equation 1, for example, if smoothing is performed on a pixel X1 410, the pixel X1 410 can be generated as having a pixel value X1' that has been filtered by incorporating a pixel value of a left neighboring pixel X0 400 and a pixel value of a right neighboring pixel X2 420 at a specific ratio.

Particularly, the filtered and calculated pixel value X1' may be a weighted average calculated by applying weight of 2 to the pixel to be filtered X1 410 and applying weight of 1 to the remaining neighboring pixels X0 400 and X2 420.

In the case of the reference pixel X0 400 at the left top, a bottom pixel Y1 430 and the right neighboring pixel X1 410 instead of the left neighboring pixel may be used as neighboring pixels.

FIG. 5 is a conceptual diagram showing a reference pixel smoothing method using a smoothing filter in accordance with an embodiment of the present.

FIG. 5 shows a bi-linear smoothing filter (or a bi-linear interpolation filter) that is used when the size of a transform block is the same as the size of a maximum transform block.

The bi-linear smoothing filter is a filter that calculates a weighted average by incorporating a ratio of the distances of specific pixels and performs filtering using the weighted average. For example, a pixel value can be calculated by performing a weighted average and filtering based on a ratio of the positions of pixels filtered based on values of the first pixel X0 500 and the last pixel value X8 580 that belong to pixels to be filtered.

When reference pixels have similar values, if the [1,2,1] filter described with reference to FIG. 4 is used, subjective picture quality is deteriorated. In such a case, it will be better to use a bi-linear smoothing filter in terms of subjective picture quality. If the size of a transform block is the same as the size of a maximum transform block, there is a good possibility that the reference pixels of a block may be similar pixels. In this case, the reference pixels may be filtered using a bi-linear smoothing filter.

If the size of a transform block is the same as the size of a maximum transform block and reference pixels have similar values to some extent, the reference pixels may be filtered using a bi-linear smoothing filter. Whether reference pixels have similar values to what extent may be determined according to Equation 2. If all conditions disclosed in Equation 2 are satisfied, it may be determined that reference pixels have similar values to some extent and thus bi-linear smoothing may be performed.

$$|p[-1][-1]+p[nT*2-1][-1]-2*p[nT-1][-1]|<(1<<(bitDepthY-5))$$

$$|p[-1][-1]+p[-1][nT*2-1]-2*p[-1][nT-1]|<(1<<(bitDepthY-5)) \quad (2)$$

In Equation 2, 'bitDepthY' is the number of bits of a pixel. The number of bits of a pixel is typically 8 bits and may be 10 bits or 12 bits according to circumstances. If the size of a transform block is nT, a reference pixel may be p[x][y] (x=−1, y=−1 ... nT*2−1, x=−1 ... nT*2−1, y=−1).

If a bi-linear smoothing filter is used, a filtered reference pixel pF[x][y](x=−1, y=−1 ... nT*2−1, x=−1 ... nT*2−1, y=−1) can be calculated as in Equation 3 below.

$$pF[-1][nT*2-1]=p[-1][nT*2-1]$$

$$pF[nT*2-1][-1]=p[nT*2-1][-1]$$

$$pF[-1][y]=((nT*2-1-y)*p[-1][-1]+(y+1)*p[-1][nT*2-1]+nT)>>(1+\log_2(nT)) \text{ for } y=0 \ldots nT*2-2$$

$$pF[-1][-1]=p[-1][-1]$$

$$pF[x][-1]=((nT*2-1-x)*p[-1][-1]+(x+1)*p[nT*2-1][-1]+nT)>>(1+\log_2(nT)) \text{ for } x=0 \ldots nT*2-2 \quad (3)$$

In an intra-prediction method in accordance with an embodiment of the present invention, intra-prediction can be performed using a different intra-prediction method even in the same intra-prediction mode based on the size of a transform block and the size of a maximum transform block.

For example, if an intra-prediction mode for a transform block includes No. 1 (DC mode), No. 26 (vertical mode), and No. 10 (horizontal mode), the size of the transform block may be compared with the size of a maximum transform block, and a prediction block may be generated using different methods when the size of the transform block is the same as and not the same as the size of the maximum transform block.

If the size of a transform block is not the same as the size of a maximum transform block, the predicted sample of a prediction block whose an intra-prediction mode includes No. 1 (DC mode), No. 26 (vertical mode), and No. 10 (horizontal mode) may be generated as in Equation 4 below.

(1) If the intra-prediction mode is No. 1 (DC mode):

$$predSample[0][0] = (p[-1][0] + 2*dcVal + p[0][-1] + 2) >> 2$$

$$predSample[x][0] = (p[x][-1] + 3*dcVal + 2) >> 2, \text{ with } x = 1 \ldots nT-1$$

$$predSample[0][y] = (p[-1][y] + 3*dcVal + 2) >> 2, \text{ with } y = 1 \ldots nT-1$$

$$predSample[x][y] = dcVal, \text{ with } x, y = 1 \ldots nT-1$$

$$dcVal = \left(\sum_{x'=0}^{nT-1} p[x'][-1] + \sum_{y'=0}^{nT-1} p[-1][y'] + nT\right) >> (k+1),$$

where $k = \log_2(nT)$ (2) If the intra-prediction mode is No. 26 (vertical mode):

$$predSample[x][y]=p[x][-1] \text{ with } x,y=0 \ldots nT-1$$

(3) If the intra-prediction mode is No. 10 (horizontal mode):

$$predSample[x][y]=p[-1][y], \text{ with } x,y=0 \ldots nT-1 \quad (4)$$

If the size of a transform block is the same as the size of a maximum transform block, the predicted sample of a prediction block whose intra-prediction mode includes No. 1 (DC mode), No. 26 (vertical mode), and No. 10 (horizontal mode) may be generated as Equation 5 below.

(1) If the intra-prediction mode is No. 1 (DC mode):

$$predSample[x][y] = dcVal, \text{ with } x, y = 1 \ldots nT - 1$$

$$dcVal = \left( \sum_{x'=0}^{nT-1} p[x'][-1] + \sum_{y'=0}^{nT-1} p[-1][y'] + nT \right) >> (k+1),$$

$$\text{where } k = \log_2(nT)$$

(2) If the intra-prediction mode is No. 26 (vertical mode):

predSample[x][y]=p[x][−1],with x=1 . . . NT−1 and y=0 . . . nT−1 predSample[x][y]=Clip1Y{p[x][−1]+((p[−1][y]−p[−1][−1])>>1},with x=0,y=0, . . . nT−1

(3) If the intra-prediction mode is No. 10 (horizontal mode):

predSample[x][y]=p[−1][y],with x=0 . . . nT−1 and y=1 . . . nT−1 predSample[x][y]=Clip1Y{p[−1][y]+((p[x][−1]−p[−1][−1])>>1},with x=0 . . . nT−1,y=0     (5)

That is, in an intra-prediction method in accordance with an embodiment of the present invention, a smoothing method and a method of generating a prediction block according to a specific intra-prediction mode may be different depending on whether or not the size of a transform block is the same as the size of a maximum transform block.

Information about the smoothing method and the method of generating a prediction block according to a specific intra-prediction mode may be newly defined in a specific syntax element or may be included in information about an existing syntax element, coded, and transmitted to the decoder.

For example, if a flag becomes 'on' based on information about the flag, a reference pixel may be smoothed using a bi-linear smoothing method and the intra-prediction method defined in Equation 5 may be performed. In contrast, if the flag becomes 'off', the reference pixel may be smoothed using the [1,2,1] filter and the intra-prediction method defined in Equation 4 may be performed. Such a method is described below as an example.

For example, information about the smoothing method and information about the method of generating a prediction block may be separately coded. Furthermore, information about the smoothing method and information about the method of generating a prediction block may be coded and decoded as a syntax element having a plurality of bits not being a flag.

Furthermore, if an existing reference pixel smoothing method and an existing intra-prediction method are used without change, coding may be performed to indicate whether or not the existing reference pixel smoothing method and the existing intra-prediction method will be used along with a reference pixel smoothing method and a method of generating a prediction block disclosed in the present invention or whether or not the reference pixel smoothing method and the intra-prediction method disclosed in the present invention will be used.

Such information about a flag or a syntax element may be defined in various higher level syntaxes and may be coded and decoded as header information. For example, the flag information may be defined as various syntax structures, such as a Video Parameter Syntax (VPS), a Sequence Parameter Set (SPS), a Picture Parameter Set (PPS), and a slice segment header, and transmitted.

Figure 6:
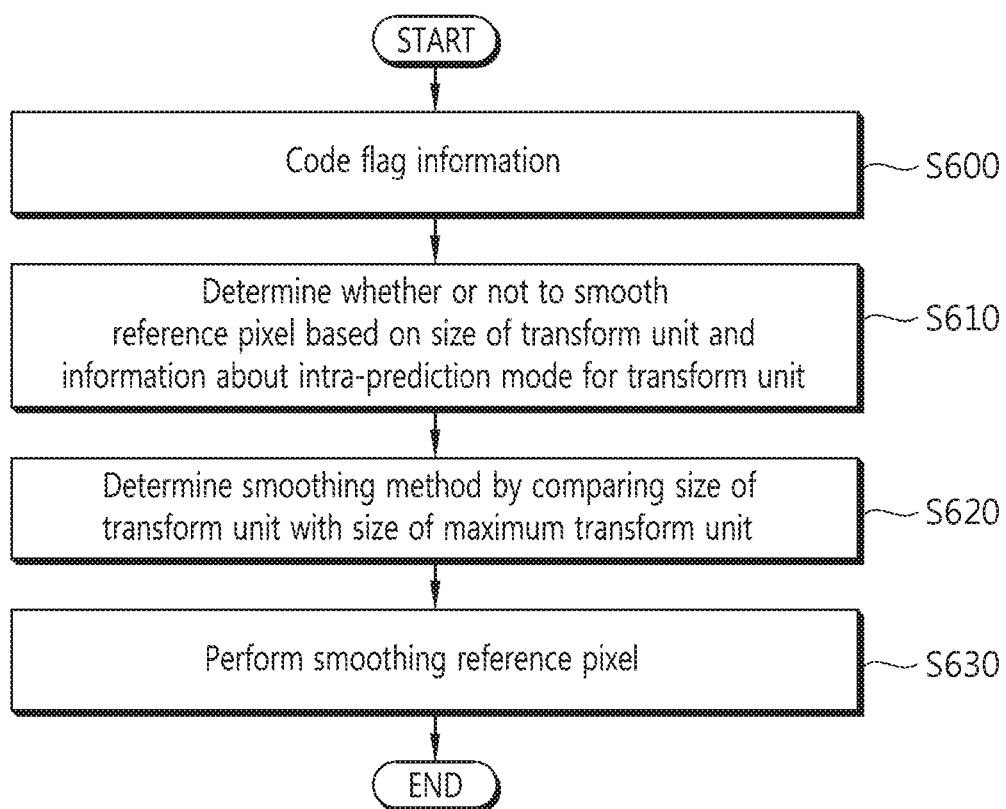
FIG. 6 is a flowchart illustrating a method of coding information for determining whether or not to perform smoothing on a reference pixel in accordance with an embodiment of the present invention.

FIG. 6 is a flowchart illustrating a method of coding information for determining whether or not to perform smoothing on a reference pixel in accordance with an embodiment of the present invention.

Referring to FIG. 6, whether or not to use the smoothing method in accordance with an embodiment of the present invention described with reference to FIGS. 3 to 5 or an existing smoothing method will be used can be determined, and the determined result can be coded as flag information at step S600.

If only the smoothing method in accordance with an embodiment of the present invention described with reference to FIGS. 3 to 5 is used without determining whether or not to use the smoothing method in accordance with an embodiment of the present invention or the existing smoothing method, step S600 of coding flag information may not be performed.

If the smoothing method described with reference to FIGS. 3 to 5 in accordance with an embodiment of the present invention is used, a prediction block can be generated according to the following procedure.

Whether or not to perform smoothing on a reference pixel is determined based on the size of a current transform block and information about an intra-prediction mode for the current transform block at step S610.

As described above with reference to FIG. 3, whether or not to perform reference pixel smoothing on the current transform block can be determined based on the size of a transform block and information about an intra-prediction mode used by the transform block. The size of a transform block and the intra-prediction mode in which reference pixel smoothing according to the size of the transform block is performed, described with reference to FIG. 3, may be changed. That is, if whether or not to perform reference pixel smoothing is determined based on the size of a transform block and an intra-prediction mode used by the transform block, this may be included in an embodiment of the present invention.

A smoothing method is determined by comparing the size of the current transform block with the size of a maximum transform block at step S620.

If, as a result of the determination at step S610, it is determined that smoothing is performed on the reference pixel of the transform block, what smoothing method will be used can be determined based on the size of the current transform block and the size of the maximum transform block.

As described above with reference to FIGS. 4 and 5, if the size of a current transform block is different from the size of a maximum transform block, smoothing can be performed using a filter having filtering coefficients of [1,2,1]. If the size of a current transform block is the same as the size of a maximum transform block, smoothing can be performed using the bi-linear filter described with reference to FIG. 5.

Smoothing is performed on a reference pixel at step S630.

The smoothing can be performed based on the smoothing method determined at step S620.

A prediction block generated based on the reference pixel smoothed through step S600 to step S630 can be added to a residual block, stored in the memory as a reconstructed block, and transmitted as information for predicting another subsequent block or picture.

Figure 7:
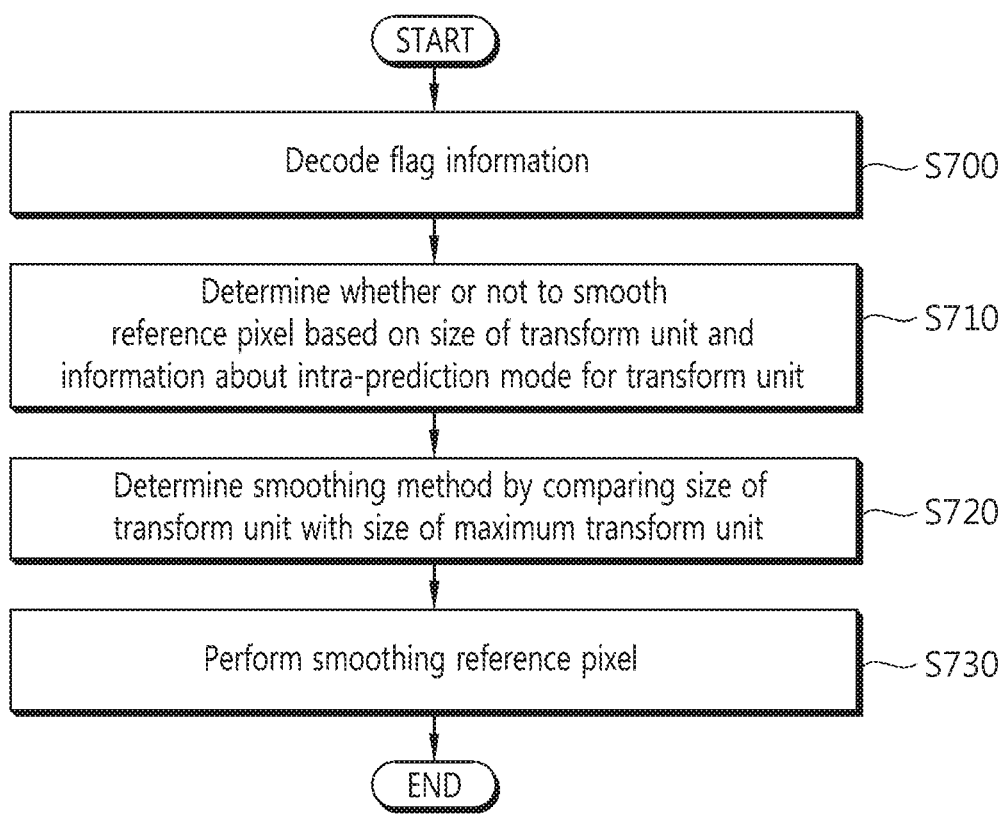
FIG. 7 is a flowchart illustrating a method of decoding information for determining whether or not to perform smoothing on a reference pixel in accordance with an embodiment of the present invention.

FIG. 7 is a flowchart illustrating a method of decoding information for determining whether or not to perform smoothing on a reference pixel in accordance with an embodiment of the present invention.

Referring to FIG. 7, whether or not to use the smoothing method in accordance with an embodiment of the present invention described with reference to FIGS. 3 to 5 or an existing smoothing method will be used can be determined, and the determined result can be decoded as flag information at step S700.

If only the smoothing method in accordance with an embodiment of the present invention described with reference to FIGS. 3 to 5 is used without determining whether or not to use the smoothing method in accordance with an embodiment of the present invention or the existing smoothing method, step S700 of decoding flag information may not be performed.

If the smoothing method described with reference to FIGS. 3 to 5 in accordance with an embodiment of the present invention is used, a prediction block can be generated according to the following procedure.

Whether or not to perform smoothing on a reference pixel is determined based on the size of a current transform block and information about an intra-prediction mode for the current transform block at step S710.

As described above with reference to FIG. 3, whether or not to perform reference pixel smoothing on the current transform block can be determined based on the size of a transform block and information about an intra-prediction mode used by the transform block. The size of a transform block and the intra-prediction mode in which reference pixel smoothing according to the size of the transform block is performed, described with reference to FIG. 3, may be changed. That is, if whether or not to perform reference pixel smoothing is determined based on the size of a transform block and an intra-prediction mode used by the transform block, this may be included in an embodiment of the present invention.

A smoothing method is determined by comparing the size of the current transform block with the size of a maximum transform block at step S720.

If, as a result of the determination at step S710, it is determined that smoothing is performed on the reference pixel of the transform block, what smoothing method will be used can be determined based on the size of the current transform block and the size of the maximum transform block.

As described above with reference to FIGS. 4 and 5, if the size of a current transform block is different from the size of a maximum transform block, smoothing can be performed using a filter having filtering coefficients of [1,2,1]. If the size of a current transform block is the same as the size of a maximum transform block, smoothing can be performed using the bi-linear filter described with reference to FIG. 5.

Smoothing is performed on a reference pixel at step S730.

The smoothing can be performed based on the smoothing method determined at step S720.

A prediction block generated based on the reference pixel smoothed through step S700 to step S730 can be added to a residual block, stored in the memory as a reconstructed block.

Table 1 and Table 2 below illustrate syntax structures when a smoothing method in accordance with an embodiment of the present invention is performed. Table 1 and Table 2 are illustrative, and other syntax structures and syntaxes may be used. Such an embodiment is also included in the scope of the present invention.

TABLE 1

Sequence_parameter_Set {
....
  strong_intra_smoothing_enabled_flag
    if(strong_intra_smoothing_enabled_flag)
max_transform_block_size_based_strong_intra_smoothing_flag
....

In Table 1, strong_intra_smoothing_enabled_flag is a flag indicating whether or not to use a bi-linear smoothing filter. If the flag is 0, the bi-linear smoothing filter may not be used. If the flag is 1, the bi-linear smoothing filter may be used. However, although the flag is 1, a value of max_transform_block_size_based_strong_intra_smoothing_flag may be additionally transmitted so that how the bi-linear smoothing filter will be applied can be determined. That is, if a value of max_transform_block_size_based_strong_intra_smoothing_flag is 1, whether or not to use the smoothing method described with reference to FIGS. 3 to 5 in accordance with an embodiment of the present invention or an existing smoothing method may be determined by comparing the size of a current transform block with the size of a maximum transform block. Furthermore, if a value of max_transform_block_size_based_strong_intra_smoothing_flag is 0, whether or not to use the smoothing method described with reference to FIGS. 3 to 5 in accordance with an embodiment of the present invention or an existing smoothing method may be determined by comparing the size of a current transform block with the size 32 of a block (i.e., a 32×32 block size).

strong_intra_smoothing_enabled_flag and max_transform_block_size_based_strong_intra_smoothing_flag shown in Table 1 do not need to be necessarily placed in Sequence_parameter_Set. In another embodiment, strong_intra_smoothing_enabled_flag and max_transform_block_size_based_strong_intra_smoothing_flag shown in Table 1 may be placed in a Video Parameter Set (VPS) or a Picture Parameter Set (PPS). Furthermore, strong_intra_smoothing_enabled_flag and max_transform_block_size_based_strong_intra_smoothing_flag do not need to be placed in the same header information. That is, in yet another embodiment, strong_intra_smoothing_enabled_flag may be placed in Sequence_parameter_Set (SPS), and max_transform_block_size_based_strong_intra_smoothing_flag may be placed in the PPS under the SPS.

Furthermore, information about a flag indicating whether or not to use the method of generating a prediction block described in connection with Equation 4 and Equation 5 may be transferred as in Table 2.

TABLE 2

Sequence_parameter_Set {
....
  max_transform_block_size_based_intra_smoothing_
  restriction_flag
....

That is, in Table 2, if a value of max_transform_block_size_based_intra_smoothing_restriction_flag is 1, the size of a transform block can be compared with the size of a maximum transform block as described in connection with Equation 4 and Equation 5 and a prediction block can be generated using Equation 5 or Equation 5.

If a value of max_transform_block_size_based_intra_smoothing_restriction_flag is 0, intra-prediction can be performed according to an intra-prediction mode based on Equation 6 and Equation 7.

If a value of max_transform_block_size_based_intra_smoothing_restriction_flag is 0 and the size of a transform block is smaller than 32×32, a prediction block can be generated using Equation 6.

(1) If the intra-prediction mode is No. 1:

$$predSample[0][0] = (p[-1][0] + 2*dcVal + p[0][-1] + 2) >> 2$$

$$predSample[x][0] = (p[x][-1] + 3*dcVal + 2) >> 2, \text{with } x = 1 \ldots nT-1$$

$$predSample[0][y] = (p[-1][y] + 3*dcVal + 2) >> 2, \text{with } y = 1 \ldots nT-1$$

$$predSample[x][y] = dcVal, \text{with } x, y = 1 \ldots nT-1$$

$$dcVal = \left(\sum_{x'=0}^{nT-1} p[x'][-1] + \sum_{y'=0}^{nT-1} p[-1][y'] + nT\right) >> (k+1),$$

$$\text{where } k = \log_2(nT)$$

(2) If the intra-prediction mode is No. 26:

predSample[x][y]=p[x][−1],with x,y=0 . . . nT−1

(3) the intra-prediction mode is No. 10:

predSample[x][y]=p[−1][y],with x,y=0 . . . nT−1    (6)

Furthermore, if a value of amax_transform_block_size_based_intra_smoothing_restriction_flag is 0 and the size of a transform block is 32×32, a prediction block can be generated using Equation 7. Since the size of the transform block is 32×32, 'nT' becomes 32 in Equation 7.

(1) If the intra-prediction mode is No. 1:

$$predSample[x][y] = dcVal, \text{with } x, y = 1 \ldots nT-1$$

$$dcVal = \left(\sum_{x'=0}^{nT-1} p[x'][-1] + \sum_{y'=0}^{nT-1} p[-1][y'] + nT\right) >> (k+1),$$

$$\text{where } k = \log_2(nT)$$

(2) If the intra-prediction mode is No. 26:

predSample[x][y]=p[x][−1],with x=1 . . . NT−1 and y=0 . . . nT−1 predSample[x][y]=Clip1Y{p[x][−1]+((p[−1][y]−p[−1][−1])>>1)},with x=0,y=0, . . . nT−1

(3) If the intra-prediction mode is No. 10:

predSample[x][y]=p[−1][y], with x=0 . . . nT−1 and y=1 . . . nT−1 predSample[x][y]=Clip1Y{p[−1][y]+((p[x][−1]−p[−1][−1])>>1)},with x=0 . . . nT−1,y=0    (7)

max_transform_block_size_based_intra_smoothing_restriction_flag shown in Table 2 does not need to be necessarily placed in Sequence_parameter_Set. In another embodiment, max_transform_block_size_based_intra_smoothing_restriction_flag may be placed in a Video Parameter Set (VPS) or a Picture Parameter Set (PPS).

Furthermore, max_transform_block_size_based_intra_smoothing_restriction_flag may be placed in the same header information as that of strong_intra_smoothing_enabled_flag and/or max_transform_block_size_based_strong_intra_smoothing_flag using Table 1 or may be placed in header information different from that of strong_intra_smoothing_enabled_flag and/or max_transform_block_size_based_strong_intra_smoothing_flag shown in Table 1.

While the invention has been shown and described with respect to the preferred embodiments, it will be understood by those skilled in the art that various changes and modifications may be made without departing from the spirit and scope of the invention as defined in the following claims.

What is claimed is:

1. An intra-prediction method in which an intra-prediction is performed on a current block, comprising:
   determining whether or not to perform smoothing on a reference pixel of the current block based on a size of a block and an intra-prediction mode for the current block, the size of the block being indicated by an encoder and transmitted to a decoder; and
   applying a bi-linear smoothing filter or a smoothing filter having predetermined filtering coefficients as the smoothing filter when it is determined that to perform the smoothing on the reference pixel of the current block,
   wherein a flag information is used for determining whether or not to perform the smoothing on the reference pixel based on a size of the current block and the intra-prediction mode for the current block, and
   wherein the bi-linear smoothing filter is a filter for calculating a filtered reference pixel, pF[x][y](x=−1, y=−1 . . . nT*2−1, x=0 . . . nT*2−1, y=−1), according to the equations:

pF[−1][nT*2−1]=p[−1][nT*2−1]

pF[nT*2−1][−1]=p[nT*2−1][−1]

pF[−1][y]=(p[−1][y+1]+2*p[−1][y]+p[−1][y−1]+2)>>2 for y=nT*2−2 . . . 0 pF[−1][−1]=(p[−1][0]+2*p[−1][−1]+p[0][−1]+2)>>2 pF[x][−1]=(p[x−1][−1]+2*p[x][−1]+p[x+1][−1]+2)>>2 for x=0 . . . nT*2−2.

2. The intra-prediction method of claim 1, wherein the current block is a current transform block and the size of the current block is a size of a current transform block, and wherein the size of the current transform block is nT, a reference pixel of the current transform block is p[x][y] (x=−1, y=−1 . . . nT*2−1, x=0 . . . nT*2−1, y=−1).

3. An image decoder in which an intra-prediction is performed on a current block, comprising:
   an intra-prediction unit configured to:
   determine whether or not to perform smoothing on a reference pixel of the current block based on a size of a block and an intra-prediction mode for the current block, the size of the block being indicated by an encoder and transmitted to the decoder; and
   applying a bi-linear smoothing filter or a smoothing filter having predetermined filtering coefficients as the smoothing filter when it is determined to perform the smoothing on the reference pixel of the current block,
   wherein a flag information is used for determining whether or not to perform the smoothing on the reference pixel based on a size of the current block and the intra-prediction mode for the current block, and
   wherein the smoothing filter having the filtering coefficients of [1,2,1] is a filter for calculating a filtered reference pixel,
   pF[x][y](x=−1, y=−1 . . . nT*2−1, x=0 . . . nT*2−1, y=−1), according to the equations:

pF[−1][nT*2−1]=p[−1][nT*2−1]

pF[nT*2−1][−1]=p[nT*2−1][−1]

$$pF[-1][y]=(p[-1][y+1]+2*p[-1][y]+p[-1][y-1]+2)>>2 \text{ for } y=nT*2-2 \ldots 0$$

$$pF[-1][-1]=(p[-1][0]+2*p[-1][-1]+p[0][-1]+2)>>2$$

$$pF[x][-1]=(p[x-1][-1]+2*p[x][-1]+p[x+1][-1]+2)>>2 \text{ for } x=0 \ldots nT*2-2.$$

4. The image decoder of claim 3, wherein the current block is a current transform block and the size of the current block is a size of a current transform block, and wherein the size of the transform current block is nT, and a reference pixel of the transform block is p[x][y](x=−1, y=−1 . . . nT*2−1, x=0 . . . nT*2−1, y=−1).

5. An image decoder in which an intra-prediction is performed on a current block, comprising:
an intra-prediction unit configured to:
determine whether or not to perform smoothing on a reference pixel of the current block based on a size of a block and an intra-prediction mode for the current block, the size of the block being indicated by an encoder and transmitted to the decoder; and
applying a bi-linear smoothing filter or a smoothing filter having predetermined filtering coefficients as the smoothing filter when it is determined to perform the smoothing on the reference pixel of the current block,
wherein a flag information is used for determining whether or not to perform the smoothing on the reference pixel based on a size of the current block and the intra-prediction mode for the current block, and
wherein the bi-linear smoothing filter is a filter for calculating a filtered reference pixel,
pF[x][y](x=−1, y=−1 . . . nT*2−1, nT*2−1, y=−1), according to the equations:

$$pF[-1][nT*2-1]=p[-1][nT*2-1]$$

$$pF[nT*2-1][-1]=p[nT*2-1][-1]$$

$$pF[-1][y]=(p[-1][y+1]+2*p[-1][y]+p[-1][y-1]+2)>>2 \text{ for } y=nT*2-2 \ldots 0$$

$$pF[-1][-1]=(p[-1][0]+2*p[-1][-1]+p[0][-1]+2)>>2$$

$$pF[x][-1]=(p[x-1][-1]+2*p[x][-1]+p[x+1][-1]+2)>>2 \text{ for } x=0 \ldots nT*2-2.$$

6. The image decoder of claim 5, wherein the current block is a current transform block and the size of the current block is a size of a current transform block, and wherein the size of the current transform block is nT, a reference pixel of the current transform block is p[x][y](x=−1, y=−1 . . . nT*2−1, nT*2−1, y=−1).

7. An intra-prediction method in which an intra-prediction is performed on a current block, comprising:
determining whether or not to perform smoothing on a reference pixel of the current block based on a size of a block, a size of a current block and an intra-prediction mode for the current block, the size of the block being indicated by an encoder and transmitted to a decoder; and
applying a bi-linear smoothing filter or a smoothing filter having predetermined filtering coefficients as the smoothing filter when it is determined to perform the smoothing on the reference pixel of the current block,
wherein the smoothing filter having the filtering coefficients of [1,2,1] is a filter for calculating a filtered reference pixel,
pF[x][y](x=−1, y=−1 . . . nT*2−1, x=0 . . . nT*2−1, y=−1), according to the equations:

$$pF[-1][nT*2-1]=p[-1][nT*2-1]$$

$$pF[nT*2-1][-1]=p[nT*2-1][-1]$$

$$pF[-1][y]=(p[-1][y+1]+2*p[-1][y]+p[-1][y-1]+2)>>2 \text{ for } y=nT*2-2 \ldots 0$$

$$pF[-1][-1]=(p[-1][0]+2*p[-1][-1]+p[0][-1]+2)>>2$$

$$pF[x][-1]=(p[x-1][-1]+2*p[x][-1]+p[x+1][-1]+2)>>2 \text{ for } x=0 \ldots nT*2-2.$$

8. The intra-prediction method of claim 7, wherein the current block is a current transform block and the size of the current block is a size of a current transform block, and wherein the size of the current transform block is nT, a reference pixel of the current transform block is p[x][y] (x=−1, y=−1 . . . nT*2−1, x=0 . . . nT*2−1, y=−1).

9. An intra-prediction method in which an intra-prediction is performed on a current block, comprising:
determining whether or not to perform smoothing on a reference pixel of the current block based on a size of a block and an intra-prediction mode for the current block, the size of the block being indicated by an encoder and transmitted to a decoder; and
applying a bi-linear smoothing filter or a smoothing filter having predetermined filtering coefficients as the smoothing filter when it is determined to perform the smoothing on the reference pixel of the current block,
wherein a flag information is used for determining whether or not to perform the smoothing on the reference pixel based on a size of the current block and the intra-prediction mode for the current block, and
wherein the smoothing filter having the filtering coefficients of [1,2,1] is a filter for calculating a filtered reference pixel, pF[x][y](x=−1, y=−1 . . . nT*2−1, nT*2−1, y=−1), according to the equations:

$$pF[-1][nT*2-1]=p[-1][nT*2-1]$$

$$pF[nT*2-1][-1]=p[nT*2-1][-1]$$

$$pF[-1][y]=(p[-1][y+1]+2*p[-1][y]+p[-1][y-1]+2)>>2 \text{ for } y=nT*2-2 \ldots 0$$

$$pF[-1][-1]=(p[-1][0]+2*p[-1][-1]+p[0][-1]+2)>>2$$

$$pF[x][-1]=(p[x-1][-1]+2*p[x][-1]+p[x+1][-1]+2)>>2 \text{ for } x=0 \ldots nT*2-2.$$

* * * * *